United States Patent
Perkins et al.

(10) Patent No.: US 7,570,424 B2
(45) Date of Patent: Aug. 4, 2009

(54) MULTILAYER WIRE-GRID POLARIZER

(75) Inventors: Raymond T. Perkins, Orem, UT (US); Cheng-Yuan Cheng, Chandler, AZ (US); Douglas P. Hansen, Spanish Fork, UT (US); Eric W. Gardner, Eagle Mountain, UT (US)

(73) Assignee: Moxtek, Inc., Orem, UT (US)

( * ) Notice: Subject to any disclaimer, the term of this patent is extended or adjusted under 35 U.S.C. 154(b) by 78 days.

(21) Appl. No.: 11/005,927

(22) Filed: Dec. 6, 2004

(65) Prior Publication Data

US 2006/0119937 A1   Jun. 8, 2006

(51) Int. Cl.
G02B 5/30   (2006.01)
(52) U.S. Cl. .................. 359/486; 359/495; 359/576
(58) Field of Classification Search .................. 359/486
See application file for complete search history.

(56) References Cited

U.S. PATENT DOCUMENTS

| | | |
|---|---|---|
| 2,224,214 A | 12/1940 | Brown |
| 2,287,598 A | 6/1942 | Brown |
| 2,403,731 A | 7/1946 | MacNeille |
| 2,748,659 A | 6/1956 | Geffcken et al. |
| 2,887,566 A | 5/1959 | Marks |
| 3,046,839 A | 7/1962 | Bird et al. |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,073,571 A | 2/1978 | Grinberg et al. |
| 4,104,598 A | 8/1978 | Abrams |

(Continued)

FOREIGN PATENT DOCUMENTS

DE   3707984 A1   3/1987

(Continued)

OTHER PUBLICATIONS

Auton and Hutley, "Grid Polarizers for Use in the Near Infrared," Infrared Physics, 1972, vol. 12, pp. 95-100, Pergamon Press, Great Britain.

(Continued)

Primary Examiner—Arnel C Lavarias
(74) Attorney, Agent, or Firm—Thorpe North & Western, LLP (57) ABSTRACT

A multilayer wire-grid polarizer for polarizing light includes a stack of thin film layers disposed over a substrate, including a wire-grid array of elongated metal elements having lengths longer than a wavelength of the light and a period less than half the wavelength of the light. One of the layers can include a thin film layer with a refractive index greater than a refractive index of the substrate. One of the thin film layers can include a dielectric array of non-metal elements.

19 Claims, 11 Drawing Sheets

U.S. PATENT DOCUMENTS

| | | | |
|---|---|---|---|
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,560,599 A | 12/1985 | Regen |
| 4,679,910 A | 7/1987 | Efron et al. |
| 4,688,897 A | 8/1987 | Grinberg et al. |
| 4,711,530 A | 12/1987 | Nakanowatari et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,895,769 A | 1/1990 | Land et al. |
| 4,904,060 A | 2/1990 | Grupp |
| 4,913,529 A | 4/1990 | Goldenberg et al. |
| 4,946,231 A | 8/1990 | Pistor |
| 4,966,438 A | 10/1990 | Mouchart et al. |
| 4,991,937 A | 2/1991 | Urino |
| 5,029,988 A | 7/1991 | Urino |
| 5,061,050 A | 10/1991 | Ogura |
| 5,087,985 A | 2/1992 | Kitaura et al. |
| 5,113,285 A | 5/1992 | Franklin et al. |
| 5,115,305 A | 5/1992 | Baur et al. |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,177,635 A | 1/1993 | Keilmann |
| 5,204,765 A | 4/1993 | Mitsui et al. |
| 5,216,539 A | 6/1993 | Boher et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,267,029 A | 11/1993 | Kurematsu et al. |
| 5,279,689 A | 1/1994 | Shvartsman |
| 5,295,009 A | 3/1994 | Barnik et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,422,756 A | 6/1995 | Weber |
| 5,436,761 A | 7/1995 | Kamon |
| 5,466,319 A | 11/1995 | Zager et al. |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,506,704 A | 4/1996 | Broer et al. |
| 5,508,830 A | 4/1996 | Imoto et al. |
| 5,513,023 A | 4/1996 | Fritz et al. |
| 5,513,035 A | 4/1996 | Miyatake et al. |
| 5,517,356 A | 5/1996 | Araujo et al. |
| 5,557,343 A | 9/1996 | Yamagishi |
| 5,559,634 A | 9/1996 | Weber |
| 5,570,215 A | 10/1996 | Omae et al. |
| 5,574,580 A | 11/1996 | Ansley |
| 5,579,138 A | 11/1996 | Sannohe et al. |
| 5,594,561 A | 1/1997 | Blanchard |
| 5,609,939 A | 3/1997 | Petersen et al. |
| 5,612,820 A | 3/1997 | Schrenk et al. |
| 5,619,356 A | 4/1997 | Kozo et al. |
| 5,626,408 A | 5/1997 | Heynderickx et al. |
| 5,658,060 A | 8/1997 | Dove |
| 5,686,979 A | 11/1997 | Weber et al. |
| 5,731,246 A | 3/1998 | Bakeman et al. |
| 5,748,368 A | 5/1998 | Tamada et al. |
| 5,748,369 A | 5/1998 | Yokota |
| 5,798,819 A | 8/1998 | Hattori et al. |
| 5,826,960 A | 10/1998 | Gotoh et al. |
| 5,833,360 A | 11/1998 | Knox et al. |
| 5,838,403 A | 11/1998 | Jannson et al. |
| 5,841,494 A | 11/1998 | Hall |
| 5,986,730 A | 11/1999 | Hansen et al. |
| 5,991,075 A | 11/1999 | Katsuragawa et al. |
| 6,075,235 A | 6/2000 | Chun |
| 6,081,376 A | 6/2000 | Hansen et al. |
| 6,082,861 A | 7/2000 | Dove et al. |
| 6,096,155 A | 8/2000 | Harden et al. |
| 6,108,131 A | 8/2000 | Hansen et al. |
| 6,122,103 A | 9/2000 | Perkins et al. |
| 6,234,634 B1 | 5/2001 | Hansen et al. |
| 6,250,762 B1 | 6/2001 | Kuijper |
| 6,288,840 B1 | 9/2001 | Perkins et al. |
| 6,310,345 B1 | 10/2001 | Pittman et al. |
| 6,340,230 B1 | 1/2002 | Bryars et al. |
| 6,585,378 B2 | 7/2003 | Kurtz et al. |
| 6,665,119 B1 * | 12/2003 | Kurtz et al. ................ 359/486 |
| 6,666,556 B2 | 12/2003 | Hansen et al. |
| 6,785,050 B2 | 8/2004 | Lines et al. |
| 7,013,064 B2 * | 3/2006 | Wang ............................ 385/37 |
| 7,227,684 B2 * | 6/2007 | Wang ........................... 359/486 |
| 7,268,946 B2 * | 9/2007 | Wang ........................... 359/569 |
| 2002/0015135 A1 | 2/2002 | Hansen et al. |
| 2002/0122235 A1 | 9/2002 | Kurtz et al. |
| 2002/0191286 A1 | 12/2002 | Gale et al. |
| 2003/0117708 A1 | 6/2003 | Kane |
| 2003/0180024 A1 | 9/2003 | Edlinger et al. |
| 2004/0070829 A1 | 4/2004 | Kurtz et al. |
| 2004/0125449 A1* | 7/2004 | Sales ........................... 359/486 |
| 2004/0201889 A1* | 10/2004 | Wang et al. ................. 359/486 |

FOREIGN PATENT DOCUMENTS

| | | |
|---|---|---|
| EP | 0317910 A1 | 11/1987 |
| EP | 0349144 B1 | 6/1988 |
| EP | 0349309 B1 | 6/1988 |
| EP | 0336334 A2 | 8/1988 |
| EP | 0357946 B1 | 8/1988 |
| EP | 0407830 A2 | 7/1989 |
| EP | 0416157 | 9/1989 |
| EP | 0488544 A1 | 11/1990 |
| EP | 0507445 A2 | 3/1991 |
| EP | 0518111 A1 | 5/1991 |
| EP | 0588937 B1 | 6/1991 |
| EP | 0521591 B1 | 7/1991 |
| EP | 0543061 A1 | 11/1991 |
| EP | 0606940 A2 | 1/1993 |
| EP | 0634674 A2 | 6/1993 |
| EP | 0670506 A1 | 9/1993 |
| EP | 566 004 | 10/1993 |
| EP | 0744634 A2 | 5/1995 |

| | | |
|---|---|---|
| JP | 4-12241 | 1/1992 |
| JP | 10-073722 | 3/1998 |
| SU | 1781659 A1 | 10/1990 |

OTHER PUBLICATIONS

Auton, "Infrared Transmission Polarizers by Photolithography," Applied Optics Jun. 1967 vol. 6, No. 6, pp. 1023-1027.

Bird and Parrish, Jr., "The Wire Grid as a Near-Infrared Polarizer," J. Op. Soc. Am. vol. 50 No. 9 (1960) pp. 886-891.

Dainty, et al, "Measurements of light scattering by a characterized random rough surface", Waves in Random Media 3 (1991) S29-S39, Printed in the United Kingdom.

DeSanto & Wombell, "Rough surface scattering", Waves in Random Media 1 (1991).

Enger and Case, "Optical elements with ultrahigh spatial-frequency surface corrugations," Applied Optics Oct. 15, 1983, vol. 22, No. 20 pp. 3220-3228, S41-S56, Printed in the United Kingdom.

Flanders, Application of ~100 Å linewidth structures fabricated by shadowing techniques[B]), J. Vac. Sci. Technol., 19(4), Nov./Dec. 1981 pp. 892-896.

Flanders, "Submicronmeter periodicity gratings as artificial anisotropic dielectrics," Appl. Phys. Lett. 42 (6), Mar. 15, 1983, pp. 492-494.

Glytsis and Gaylord, "High-spatial-frequency binary and multilevel stairstep gratings: polarization-selective mirrors and broadband antireflection surfaces," Applied Optics Aug. 1, 1992 vol. 31, No. 22 pp. 4459-4470.

Haggans et al., "Lamellar gratings as polarization components for specularly reflected beams," Journal of Modern Optics, 1993, vol. 40, No. 4, pp. 675-686.

Handbook of Optics vol. II, 2nd Edition, pp. 3.32-3.35.

Handbook of Optics, 1978, pp. 10-68-10-77.

Hass and O'Hara, "Sheet Infrared Transmission Polarizers," Applied Optics Aug. 1965, vol. 4, No. 8 pp. 1027-1031.

Knop, "Reflection Grating Polarizer for the Infrared," Optics Communications vol. 26, No. 3, Sep. 1978, pp. 281-283.

Kuta and van Driel, "Coupled-wave analysis of lamellar metal transmission gratings for the visible and the infrared," J. Opt. Soc. Am. A/vol. 12, No. 5/May 1995 pp. 1118-1127.

Lavin, "Specular Reflection", Monographs on App. Opt. No. 2 pp. 26-35.

Li Li and J.A. Dobrowski, "Visible broadband, wide-angle, thin-film multilayer polarizing beam splitter," Applied Optics May 1, 1996, vol. 35, No. 13, pp. 221-224.

Lloyd William Taylor Manual of Advanced Undergraduate Experiments in Physics, p. 302 (1959) Electricity and Magnetism, Addison-Wesley Publishing Company 1961.

Lockbihler and Depine, "Diffraction from highly conducting wire gratings of arbitrary cross-section," Journal of Modern Optics, 1993, vol. 40, No. 7, pp. 1273-1298.

Maystre & Dainty, Modern Analysis of Scattering Phenomena Proceeding from International Workshop held at Domaine deTournon, Aix en Provence, France Sep. 5-8, 1990.

N.M. Ceglio, Invited Review "Revolution in X-Ray Optics", J. X-Ray Science & Tech. 1, 7-78 (1989) pp. 8-78.

Nordin et al., "Micropolarizer array for infrared imaging polarimetry", J. Op. Soc. Am. A. vol. 16 No. 5/May 1999, pp. 1168-1174.

Novak et al., "Far infrared polarizing grids for use at cryogenic temperatures," Applied Optics, Aug. 15, 1989/vol. 28, No. 15, pp. 3425-3427.

Optics 9th Edition, © M. H. Freeman and B.L. Hasler "Linear polarization by anisotrophy-crystals and grids" pp. 338-339 (1980).

Sonek et al., "Ultraviolet grating polarizers," J. Vac. Sci. Technol., 19(4), Nov./Dec. 1981, pp. 921-923.

Stenkamp et al, "Grid polarizer for the visible spectral region," SPIE vol. 2213 pp. 288-296.

Whitbourn and Douglas, "Phase shifts in transmission line models of thin periodic metal grids," Applied Optics Aug. 15, 1989 vol. 28, No. 15, pp. 3511-3515.

Zanzucchi and Thomas "Corrosion Inhibitors for Aluminum Films" David Sarnoff Research Center Princeton, New Jersey pp. 1370-1375.

* cited by examiner

MULTILAYER WIRE-GRID POLARIZER

BACKGROUND

The present invention relates generally to wire-grid polarizers for the visible and near visible spectrum.

A wire grid polarizer (WGP) is an array of parallel wires disposed on the surface of a substrate, such as glass. Usually wire-grid polarizers are a single, periodic array of wires on the substrate. The grid acts as a diffraction grating when the period of the wires is greater than about half of the wavelength of light. The grid acts as a polarizer when the period of the wires is less than about half the wavelength of light.

While it is desirable for a WGP to transmit all of the light of one polarization and reflect all of the other polarization, no polarizer is perfect. Real WGPs will transmit some of the light of both polarizations and will reflect some of the light of both polarizations. When light is incident on the surface of a transparent material, such as a sheet of glass, a small amount of the light is reflected. For example, at normal incidence, about 4% of the incident light is reflected from each surface of the glass.

It has been suggested to dispose a film under a WGP, or between the wires and the substrate, to move the first diffraction order to shorter wavelengths in order to improve performance in part of the visible spectrum, such as blue light. See U.S. Pat. No. 6,122,103. The film has an index of refraction less than that of the substrate. It has also been suggested to etch into either the substrate or underlying layer to further reduce the effective refractive index under the wire grid. See U.S. Pat. No. 6,122,103. It has been further suggested to form each wire as a composite with alternating metal and dielectric layers. See U.S. Pat. No. 6,532,111.

SUMMARY

It has been recognized that it would be advantageous to develop a wire-grid polarizer with improved performance, or a wire-grid polarizer with increased transmission of a desired polarization state, such as p, and decreased transmission (or increased reflection) of another polarization state, such as s. In addition, it has been recognized that a wire-grid polarizer can act as a metal for reflecting one polarization state and act as a thin film of lossy dielectric for the other polarization state. Thus, it has been recognized that form birefringence and effective index of refraction can be applied to a wire-grid polarizer. In addition, it has been recognized that a wire-grid polarizer can be treated as a thin film layer, and incorporated into an optical stack.

Briefly, and in general terms, the invention is directed to multilayer wire-grid polarizers for polarizing light. In accordance with one aspect of the invention, the polarizer includes at least one thin film layer disposed on a substrate and having a refractive index greater than a refractive index of the substrate. A wire-grid layer is disposed over the at least one thin film layer. The wire-grid layer includes an array of elongated metal elements having lengths longer than a wavelength of the light and a period less than half the wavelength of the light.

In accordance with another aspect of the present invention, the polarizer includes a wire-grid layer disposed over a substrate. The wire-grid layer includes an array of elongated metal elements having lengths longer than a wavelength of the light and a period less than half the wavelength of the light. A dielectric layer is disposed over the wire-grid layer. The dielectric layer includes an array of non-metal elements. At least one thin film layer is disposed between the wire-grid layer and the dielectric layer.

In accordance with another aspect of the present invention, the polarizer includes a stack of thin film layers disposed over a substrate and extending continuously across the substrate. At least one of the thin film layers is uniform in structure and material. At least one of the thin film layers includes a wire-grid array of elongated metal elements having lengths longer than a wavelength of the light and a period less than half the wavelength of the light. At least one of the thin film layers includes a dielectric array of non-metal elements.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

It has been recognized that, for one polarization of light, a wire-grid polarizer substantially acts as a metal that reflects the light (or one polarization thereof), while for the other polarization of the light, the wire-grid polarizer substantially acts as a thin film of lossy dielectric that transmits the light (or another polarization thereof). Thus, it has been recognized that two concepts, namely form birefringence and effective index of refraction, can be applied to improve the performance of the polarizer.

A wire-grid polarizer is not typically considered an example of form birefringence. Generally, birefringence means that a material has a different index of refraction for different polarizations. Birefringence is very common in crystalline materials, such as quartz, and in stretched polymers. Form birefringence refers to birefringence caused by the shape of a material.

When a material has variations in material properties, such as density, with the scale of the variation being smaller than the wavelength of light, the index of refraction is different from the index of uniform bulk material. There is an effective refractive index, which is the index that a uniform thin film would have that causes the same affect on light. The theoretical treatment of this effect is called effective medium theory. This phenomenon is used with dielectric materials to make such things as moth-eye antireflection coatings.

In addition, a wire-grid polarizer is not typically considered a thin film. In optics, both form birefringence and effective index are typically considered only for dielectric materials. It has been recognized, however, that treating a wire-grid polarizer as an equivalent birefringent thin film with effective indices of refraction allows one to consider it as an element in a thin film stack, and to use thin film design techniques with particular performance goals.

The present invention utilizes thin films in combination with a metallic wire grid polarizer to improve performance of the polarizer. Generally this may include films under and on top of the wire grid. Any one of these films may be uniform or a dielectric grid. The wire grid may be a composite grid, or have composite wires. Combining the wire grid with multiple layers of different material, and thus different refractive indices, can reduce reflection of the polarization that is desired to be transmitted. For example, a wire grid can be configured to reflect s polarized light, and transmit p polarized light. As discussed above, while it is desirable to transmit all the p polarized light and reflect all the s polarized light, a typical wire grid will transmit some of both polarizations and reflect some of both polarizations. It has been found, however, that treating the wire grid as a birefringent thin film, and combining the wire grid with multiple thin films, reduces reflection of p polarized light.

Figure 1:
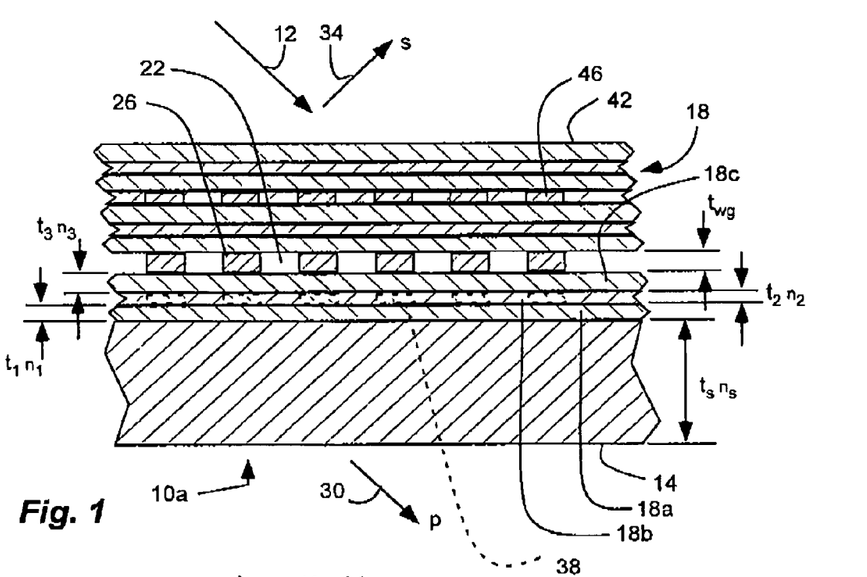
FIGS. 1 and 2 are cross-sectional side schematic views of multilayer wire grid polarizers in accordance with embodiments of the present invention (the figures are not to scale and features are shown greatly exaggerated for clarity)
Figure 2:
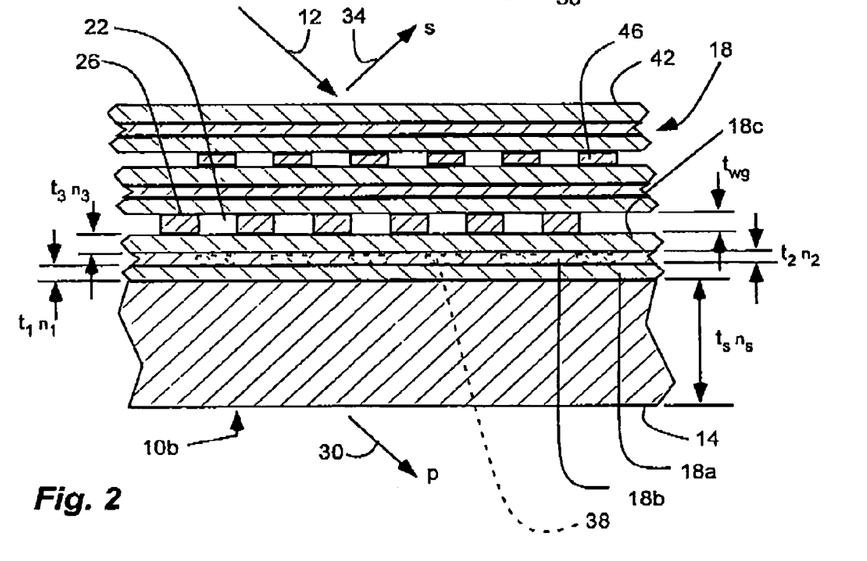

As illustrated in FIGS. 1 and 2, multilayer wire-grid polarizer devices, indicated generally at 10a and 10b, respectively, are shown as exemplary implementations in accordance with the invention for polarizing light 12, or substantially separating one polarization state from an orthogonal polarization state, and doing so in an improved manner, with less reflection and/or transmission of unwanted polarizations. Such devices are believed to have substantial utility in visible light applications, or for use with visible light in the range of approximately 400-700 nm (nanometers), or 0.4-0.7 µm (micrometers or microns). Such visible light applications can include projection display devices such as projectors. The multilayer wire-grid polarizer devices described herein can be utilized in various different capacities, such as polarizers, beam splitters, analyzers, etc. It is also believed that the devices herein have utility in near-visible applications, such as ultraviolet and/or infrared applications, or for use with light in the range of approximately 250-400 nm or 700-10,000 nm. Thus, the term "light" is used broadly herein to refer to visible light, ultraviolet light and infrared light, or electromagnetic waves in the range of 250-10,000 nm.

The polarizers 10a and 10b include a substrate 14 carrying or supporting a plurality or stack of thin film layers 18, including a wire grid or a wire grid layer 22. The substrate 14 can be transparent to the light being treated. For example, the substrate can be glass (Bk7). Other substrates can be quartz or plastic. In addition, the substrate 14 can have a substantial thickness $t_s$ with respect to the remaining thin film layers. Furthermore, the substrate can have a refractive index (or index of refraction) $n_s$. For example, a glass substrate (Bk7) has a refractive index $n_s$ of 1.52 (at 550 nm). (It will be appreciated that the refractive index varies slightly with wavelength.)

The wire grid or wire grid layer 22 includes a wire-grid array of elongated metal elements 26. The elements 26 have lengths longer than a wavelength of the light, and are located in a generally parallel arrangement with a period P less than half the wavelength of the light. Thus, for use with visible light, the elements 26 have a length larger than the wavelength of visible light, or greater than 700 nm (0.7 µm). The length, however, can be much longer. The elements 26 can have a center-to-center spacing, pitch or period P less than half the wavelength of visible light, or less than 200 nm (0.2 µm). The elements 26 can also have a width w in the range of 10 to 90% of the pitch or period. The elements 26 can also have a thickness or a height t less than the wavelength of the light, or less than 400 nm (0.4 µm) for visible light applications. In one aspect, the thickness can be less than 0.2 µm for visible light applications.

The elements 26, or the array, generally interact with the visible light to generally 1) transmit a transmitted beam 30 having a substantially uniform and constant linear polarization state (such as p polarization), and 2) reflect a reflected beam 34 also have a substantially uniform and constant linear polarization state (such as s polarization). The elements generally transmit light with a first polarization state (p polarization), oriented locally orthogonal or transverse to the elements, and reflect light with a second polarization state (s polarization), oriented parallel to the elements. It will be appreciated that the wire-grid polarizer will separate the polarization states of the light with a certain degree of efficiency, or some of both polarization states may be transmitted and/or reflected. It will also be appreciated that a portion of the elements can be configured to transmit or reflect a different polarization state.

The elements 26 or array can be formed on or over the substrate by photo-lithography. The elements 26 can be conductive, and can be formed of aluminum, silver, gold or copper.

The plurality of thin film layers 18 can include layers under and/or over the wire grid layer 22. Thus, one or more layers 18a-c can be disposed between the substrate 14 and the wire grid layer 22. In addition, one or more layers can be disposed over the wire grid layer 22. The layers 18 can be formed of different materials, or materials different than the substrate 14, and even from each other. Thus, the layers 18 can have refractive indices n different than the refractive index $n_s$ of the substrate 14. Furthermore, it has been found that at least one of the layers 18a-c having a refractive index $n_{1-3}$ greater than the refractive index $n_s$ of the substrate 14 decreases reflection of the p polarized light. Thus, in accordance with one aspect of the invention, the polarizer 10a or 10b has at least one thin film layer 18a disposed between the substrate 14 and the wire grid layer 22, and the thin film layer 18a has a refractive index $n_1$ greater than the refractive index $n_s$ of the substrate 14. In accordance with another aspect of the invention, the polarizer 10a or 10b can have at least two thin film layers 18a and b, or at least three thin film layers 18a-c.

The thin film layers 18a-c can extend continuously across the substrate 14, and can be consistent or constant layers, indicated by 18a and 18c. The layers 18a-c can be formed of dielectric material. For example, the layers can be formed of: aluminum oxide; antimony trioxide; antimony sulphide; beryllium oxide; bismuth oxide; bismuth triflouride; cadmium sulphide; cadmium telluride; calcium fluoride; ceric oxide; chiolite; cryolite; germanium; hafnium dioxide; lanthanum fluoride; lanthanum oxide; lead chloride; lead fluoride; lead telluride; lithium fluoride; magnesium fluoride; magnesium oxide; neogymium fluoride; neodymium oxide; praseodymium oxide; scandium oxide; silicon; silicon oxide; disilicon trioxide; silicon dioxide; sodium fluoride; tantalum pentoxide; tellurium; titanium dioxide; thallous chloride; yttrium oxide; zinc selenide; zinc sulphide; and zirconium dioxide. The film layers can be deposited on the substrate. In the case of metal oxides, they can be deposited by starting with an oxide evaporant material (with additional oxygen backfill as needed). The material, however, can also be deposited by evaporating a base metal, then oxidizing the deposited material with O2 in the background.

The thicknesses $t_{1-3}$ and materials (or refractive indices $n_{1-3}$) of the thin film layers 18a-c can be manipulated to reduce reflection of p polarized light, as described in greater detail below.

One or more of the thin film layers 18a-c can include a dielectric grid including an array of non-metal elements 38. The non-metal and metal elements 38 and 26 of the arrays can be oriented substantially parallel with one another. In addition, the arrays can have substantially equal periods and/or widths. In one aspect, the non-metal elements 38 of the dielectric grid and the metal elements 26 are aligned, or the non-metal elements 38 are aligned with the metal elements 26 of the wire grid layer, as shown in FIG. 1. In another aspect, the non-metal elements 38 of the dielectric grid and the metal elements 26 are off-set, or the non-metal elements 38 are off-set with respect to the metal elements 26 of the wire grid layer, as shown in FIG. 2.

As stated above, the plurality of thin film layers 18 can include one or more other thin film layers disposed over the wire-grid layer 22. The other thin film layer can include a dielectric material, and can be continuous or constant. In addition, the other thin film layer 42 can include a dielectric grid including an array of non-metal elements 46. The non-metal and metal elements 46 and 26 of the arrays can be oriented substantially parallel with one another, and can have substantially equal periods. In one aspect, the non-metal elements 46 and metal elements 26 are aligned, or the non-metal elements 46 of the dielectric grid are aligned above or over the metal elements 26 of the wire grid layer 22, as shown in FIG. 1. In another aspect, the non-metal elements 46 and metal elements 26 are off-set, or the non-metal elements 46 of the dielectric grid are off-set above the metal elements 26 of the wire grid layer 22.

As discussed above, the number, thicknesses t, and materials (or refractive indices) of the thin film layers 18 can be varied to reduce reflection of p polarized light (increase transmission of p polarized light) and/or reduce transmission of s polarized light (increase reflection of s polarized light). Some of the layers 18a and c can be uniform in structure and material, while other layers can include grids, such as metal elements 26 of the wire grid layer 22 or non-metal elements 38 and 46 of a dielectric grid. Examples of specific configurations are discussed below.

Figure 3:
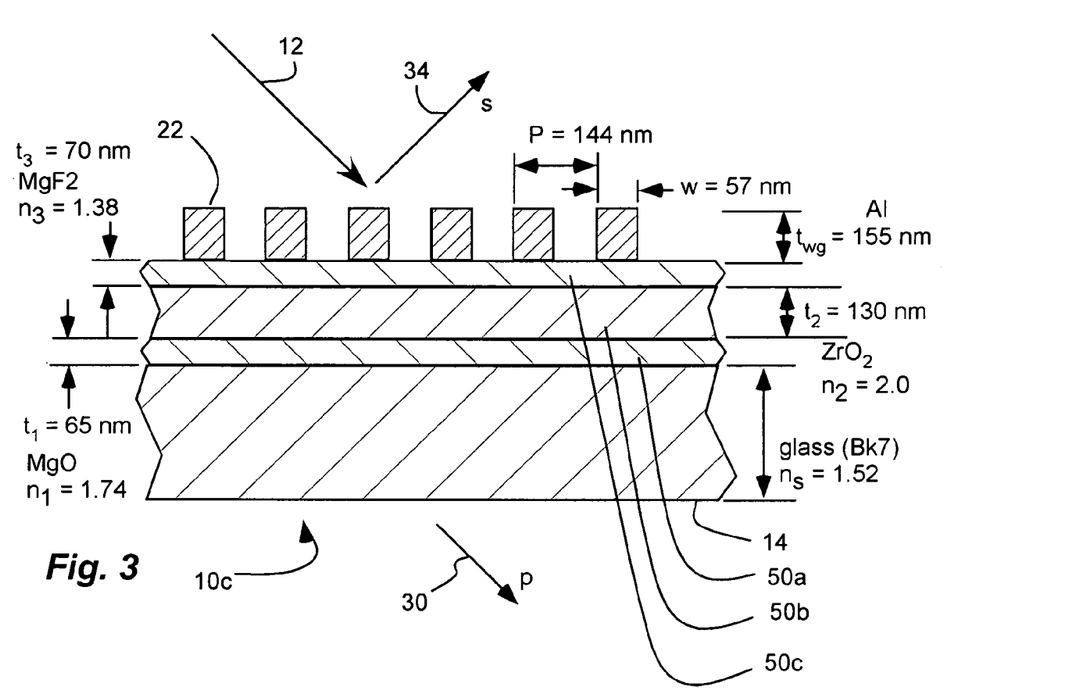
FIG. 3 is a cross-sectional side schematic view of a multilayer wire grid polarizer in accordance with an exemplary embodiment of the present invention (the figure is not to scale and features are shown greatly exaggerated for clarity)

Referring to FIG. 3, an example of a multilayer wire-grid polarizer 10c is shown. The polarizer includes three uniform thin film layers 50a-c on a glass (BK7) substrate 14 and between the substrate and the wire grid or wire grid layer 22. The substrate 14 has a refractive index $n_s$ of 1.52. The first thin film layer 50a is a uniform material of magnesium oxide (MgO) having a thickness $t_1$ of 65 nm. Thus, the first layer 50a has a refractive index $n_1$ of 1.74 (for a wavelength of 550 nm) greater than the refractive index ns of the substrate 14. The second thin film layer 50b is a uniform material of ZrO$_2$ having a thickness $t_2$ of 130 nm, and a refractive index of 2.0. Thus, the second layer 50b also has a refractive index $n_2$ greater than the refractive index $n_s$ of the substrate 14. The third thin film layer 50c is a uniform material of magnesium fluoride (MgF2) having a thickness $t_3$ of 70 nm. Thus, the third layer 50c has a refractive index $n_3$ of 1.38 (for a wavelength of 550 nm).

The wire grid layer 22 or wire grid is disposed on top of the third layer 50c. The wire grid includes elements made of aluminum. The elements can have a period P of 144 nm, a width w of 39.5% of the period, or 57 nm, and a thickness $t_{wg}$ or height of 155 nm.

Figure 4A:
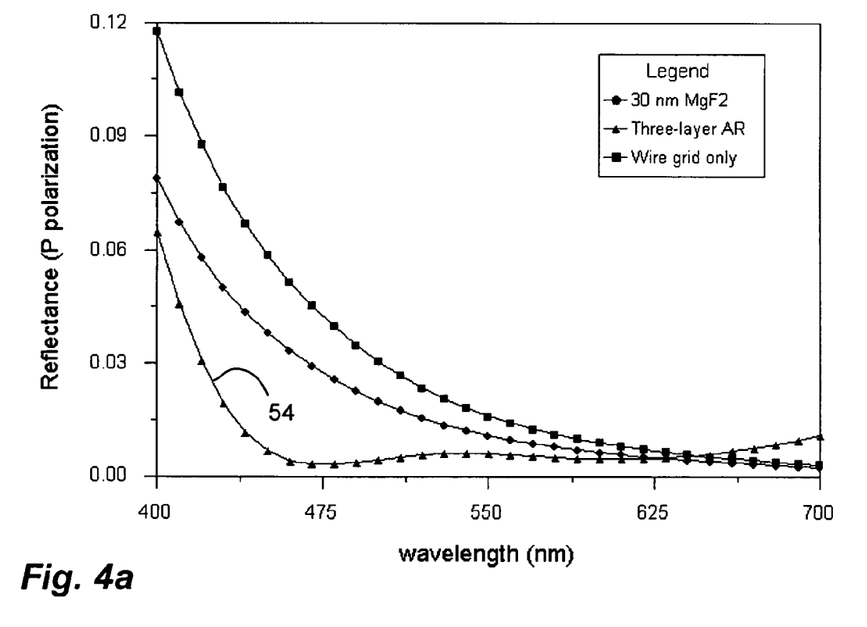
FIG. 4a is a graph of p-polarization reflection versus wavelength for the multilayer wire grid polarizer of FIG. 3 compared to other polarizers.
Figure 4B:
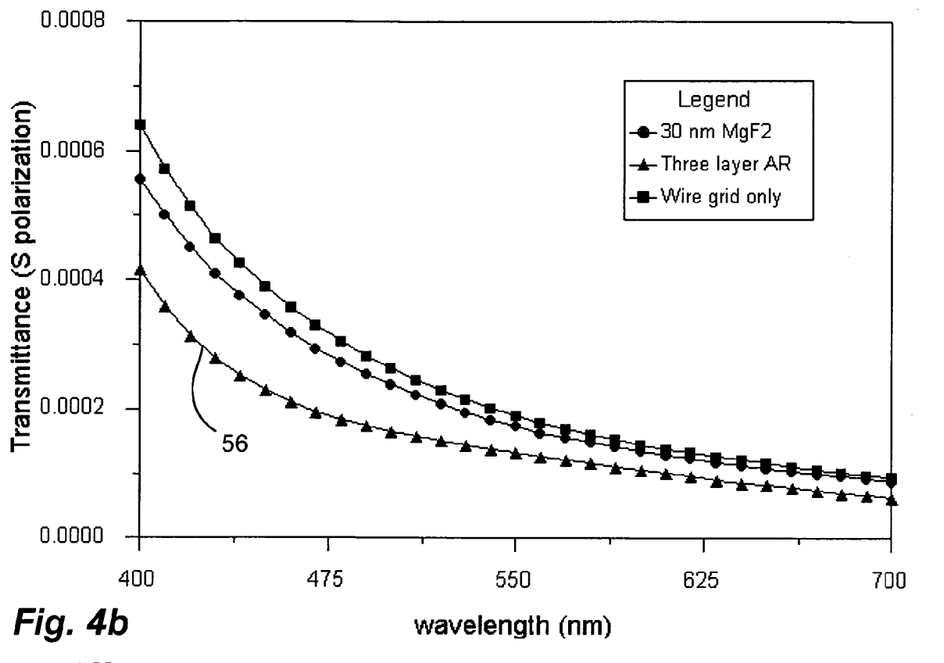
FIG. 4b is a graph of s-polarization transmittance versus wavelength for the multilayer wire grid polarizer of FIG. 3 compared to other polarizers.
Figure 4C:
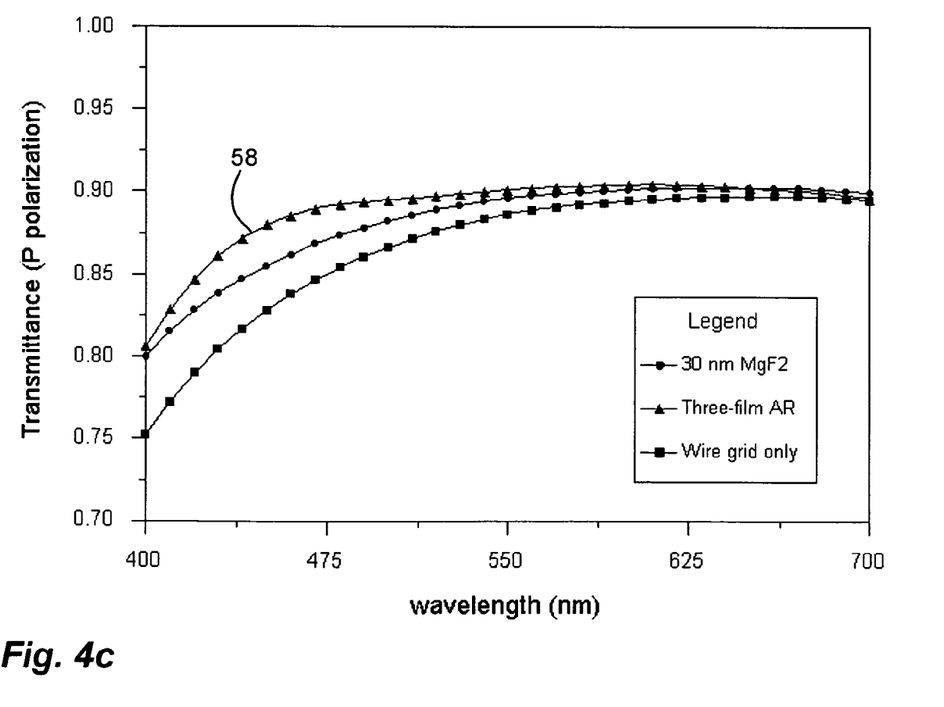
FIG. 4c is a graph of p-polarization transmittance versus wavelength for the multilayer wire grid polarizer of FIG. 3 compared to other polarizers.

Referring to FIGS. 4a-c, the performance of the polarizer 10c of FIG. 3 is compared to a similar polarizer with no thin film layers between the wire grid and substrate, and a similar polarizer with a 30 nm layer of magnesium fluoride (MgF$_2$) between the wire grid and substrate (and thus has a thin film layer with a lower refractive index than the substrate). Light 12 is incident on the polarizer 10c at an incidence angle of 45 deg. In this case, the p polarization 30 is primarily transmitted, and the s polarization 34 is primarily reflected. Referring to FIG. 4a, the transmittance of the p polarization through the polarizer 10c is greater than the other two polarizers (or the reflectance of p polarization from the polarizer is less), as shown by curve at 54. While it can be seen that the polarizer with a thin layer of lower refractive index performs better than the plain polarizer, the polarizer 10c with the three thin film layers 50a-c performs even better. Referring to FIG. 4b, transmittance (leakage) of s polarization light is less with the polarizer 10c than with either of the other polarizers (or the transmittance of s polarization through the polarizer is less), as shown by curve 56. Referring to FIG. 4c, the reflection of the p polarization is generally less with the polarizer 10c than with the other polarizers (or the transmittance of p polarization is greater), as shown by curve 58. The net result is that there is more transmitted p polarization, and improved contrast in both transmission and reflection, which means the purity of the transmitted and reflected polarizations is greater with the multiplayer polarizer 10c.

Figure 5:
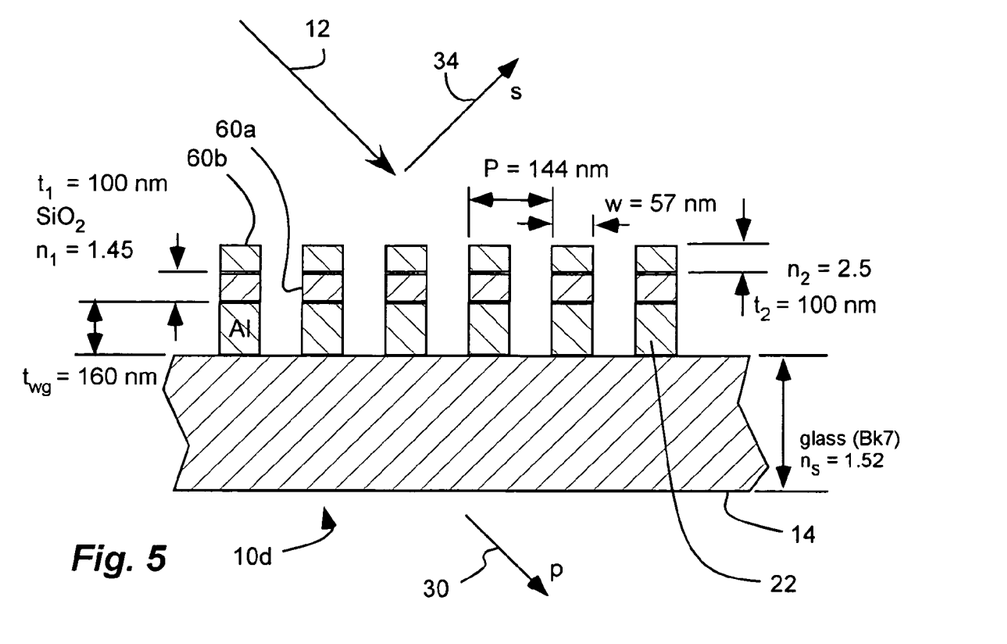
FIG. 5 is a cross-sectional side schematic view of a multilayer wire grid polarizer in accordance with an exemplary embodiment of the present invention (the figure is not to scale and features are shown greatly exaggerated for clarity)

Referring to FIG. 5, another example of a multilayer wire-grid polarizer 10d is shown. The polarizer 10d includes two dielectric layers or two dielectric grids 60a and 60b disposed directly on top of a wire grid layer 22 or wire grid with elements of aluminum. The wire grid or wire grid layer 22 is disposed on a glass (BK7) substrate 14. The thickness or height $t_{wg}$ of the elements 26 of the wire grid is 160 nm. The first dielectric grid 60a is disposed on the wire grid and has a thickness $t_1$ is 100 nm, and formed of silicon oxide (SiO2), with an index of refraction $n_1$ of 1.45. The second dielectric grid 60b also has a thickness $t_2$ of 100 nm, and is formed of a material with an index of refraction $n_2$ of 2.5. The period P of the grids is 144 nm. The width of the elements is 45% of the period P, or 57 nm. Light 12 is incident at 45 degrees.

Figure 6A:
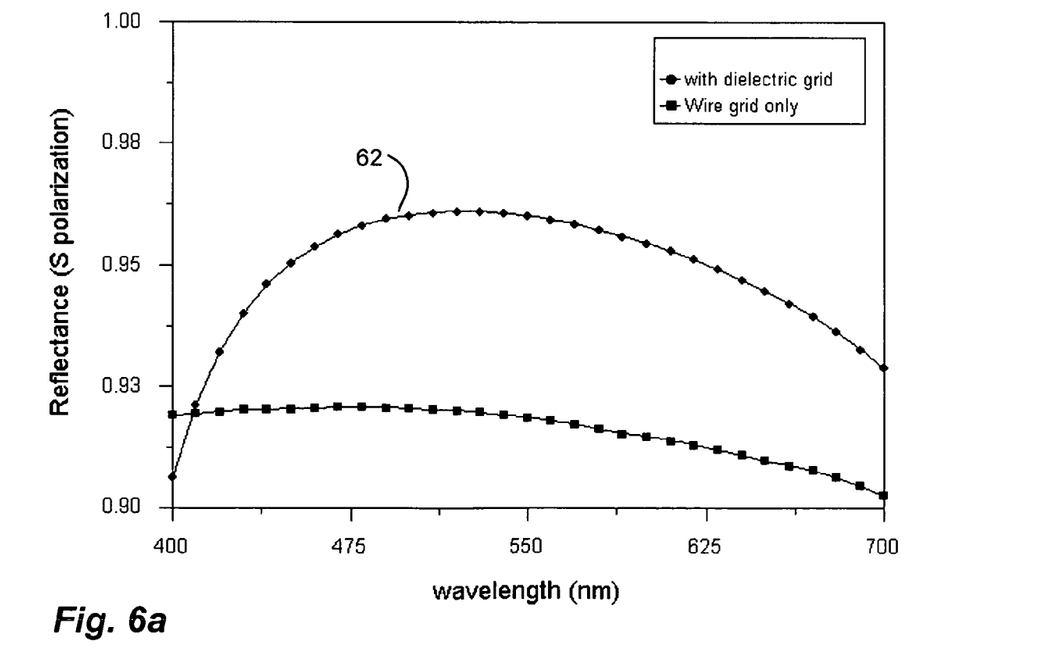
FIG. 6a is a graph of s-polarization reflection versus wavelength for the multilayer wire grid polarizer of FIG. 5 compared to another polarizer.
Figure 6B:
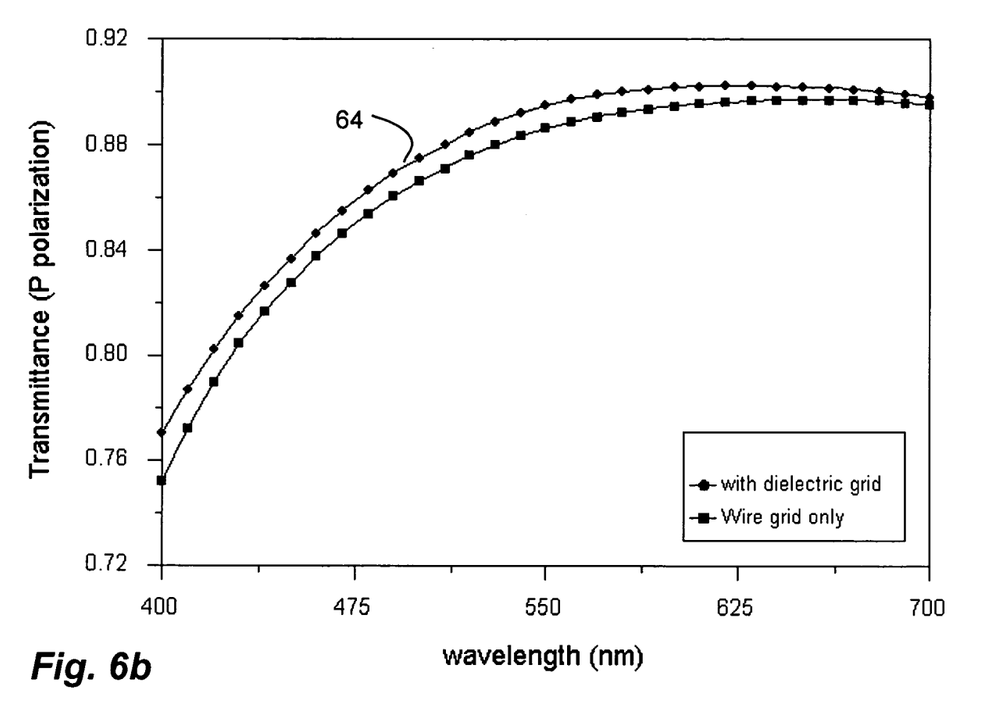
FIG. 6b is a graph of p-polarization transmittance versus wavelength for the multilayer wire grid polarizer of FIG. 5 compared to another polarizer.

Referring to FIGS. 6a and b, the performance of the polarizer 10d of FIG. 5 is compared to a similar polarizer without dielectric grids on top. Because the period P of the grids is less than the wavelength of visible light, they all essentially behave as thin films. In FIG. 6a it is seen that the reflected s polarization is substantially greater with the polarizer 10d, as shown by curve at 62. In FIG. 6b it is seen that the transmitted p polarization is also greater with the polarizer 10d, as shown by curve at 64.

Figure 7:
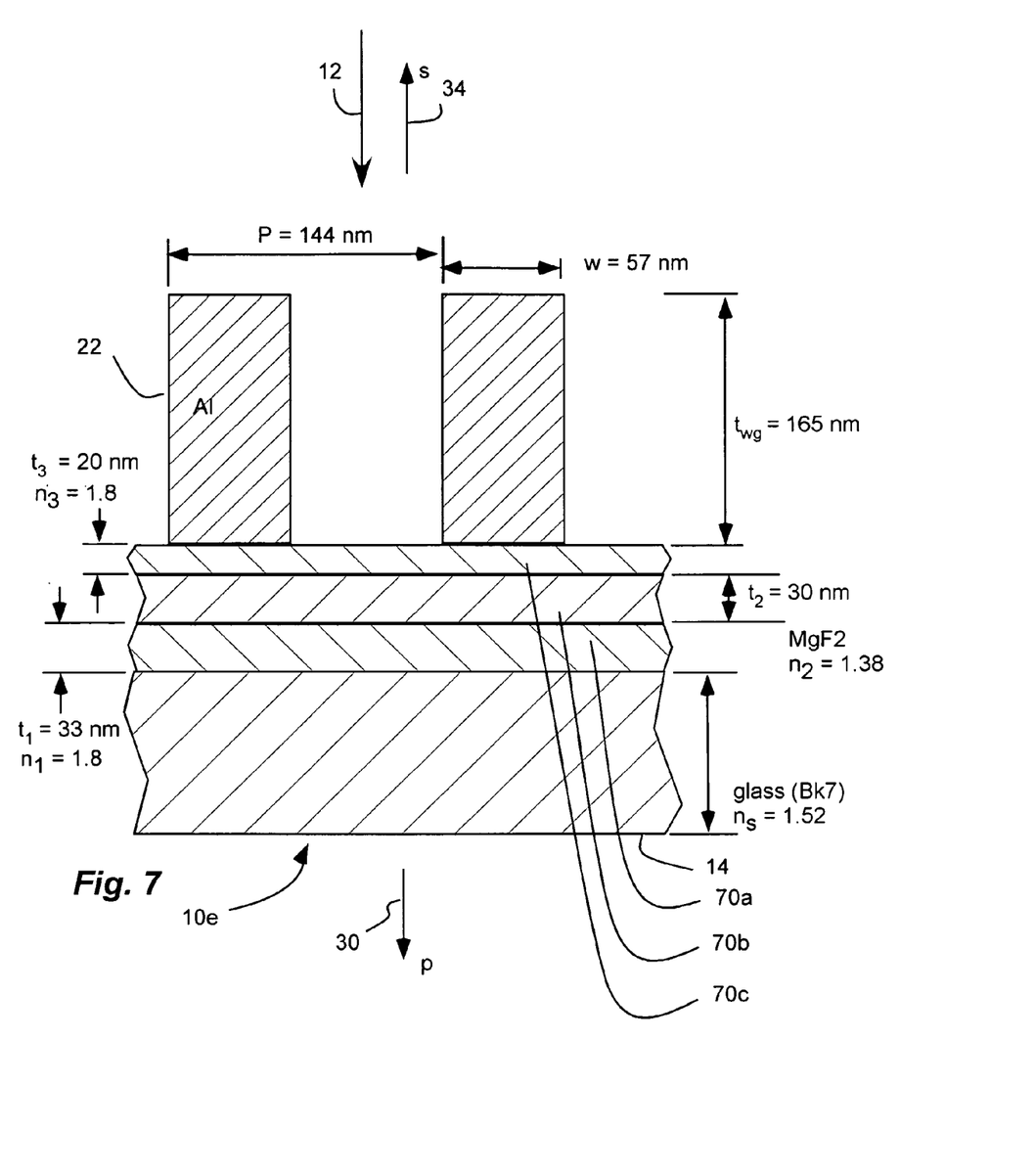
FIG. 7 is a cross-sectional side schematic view of a multilayer wire grid polarizer in accordance with an exemplary embodiment of the present invention (the figure is not to scale and features are shown greatly exaggerated for clarity)

Referring to FIG. 7, another example of a multilayer wire-grid polarizer 10e is shown. The polarizer 10e includes three uniform thin film layers 70a-c between a wire grid or wire grid layer 22 and a glass (BK7) substrate 14. The first layer 70a is disposed on the substrate 14, has a thickness $t_1$ of 33 nm thick, and has a refractive index $n_1$ of 1.8. The second layer 70b is a material of magnesium fluoride (MgF$_2$) with a refractive index $n_2$ of 1.38, and a thickness $t_2$ of 30 nm. The third layer 70c has a thickness $t_3$ of 20 nm, and has a refractive index $n_3$ of 1.8. Thus, the first and third layers 70a and c have refractive indices $n_1$ and $n_3$ greater than the refractive index $n_s$ of the substrate 14. The wire grid or wire grid layer 22 includes elements of aluminum with a period P of 144 nm. The element height $t_{wg}$ is 160 nm, and the element width w is 45% of the period, or 57 nm. Light 12 is normally incident (0 deg.).

Figure 8:
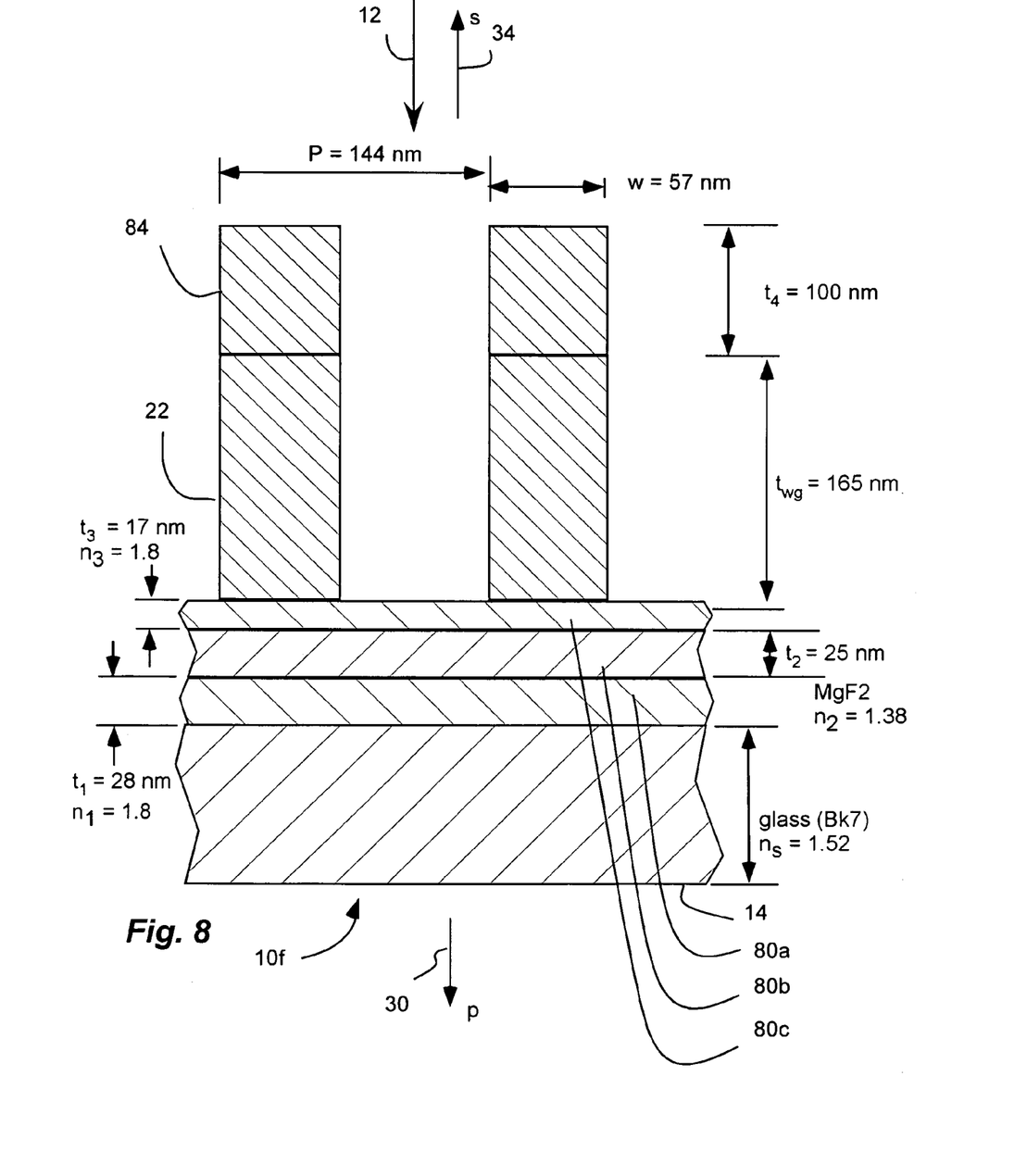
FIG. 8 is a cross-sectional side schematic view of a multilayer wire grid polarizer in accordance with an exemplary embodiment of the present invention (the figure is not to scale and features are shown greatly exaggerated for clarity)

Referring to FIG. 8, another example of a multilayer wire-grid polarizer 10f is shown. The polarizer 10e includes three thin film layers 80a-c, similar to those described above for FIG. 7, except that the first layer 80a has a thickness $t_1$ of 28 nm; the second layer 80b has a thickness $t_2$ of 25 nm; and the third layer 80c has a thickness $t_3$ of 17 nm. In addition, the polarizer 10f includes a thin film layer 84 above the wire grid layer 22. The thin film layer 84 includes a dielectric grid with non-metal elements disposed on the metal elements of the wire grid. The wire grid or wire grid layer 22 is similar to the wire grid described above for FIG. 7. The elements of the dielectric layer 84 have a thicknesses 4 of 100 nm. The elements of the dielectric layer 84 are formed of silicon dioxide (SiO$_2$).

Figure 9:
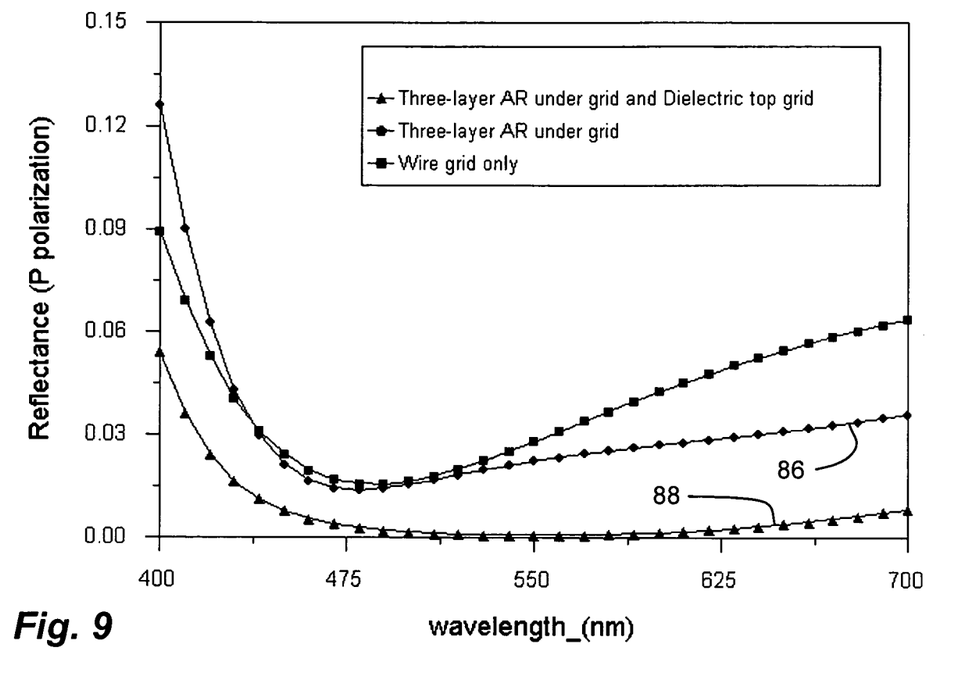
FIG. 9 is a graph of p-polarization reflection versus wavelength for the multilayer wire grid polarizers of FIGS. 7 and 8 compared to another polarizer.

Referring to FIG. 9, the performance of the polarizers 10e and f is compared with a similar wire grid polarizer without the thin film layers. Both polarizers 10e and f reflect less p polarization (pass more p polarization), as shown by curves at 86 and 88. The polarizer 10f with thin film layers under the wire grid layer and dielectric grids above the wire grid shows significant improvement, as shown by curve at 88.

Figure 10A:
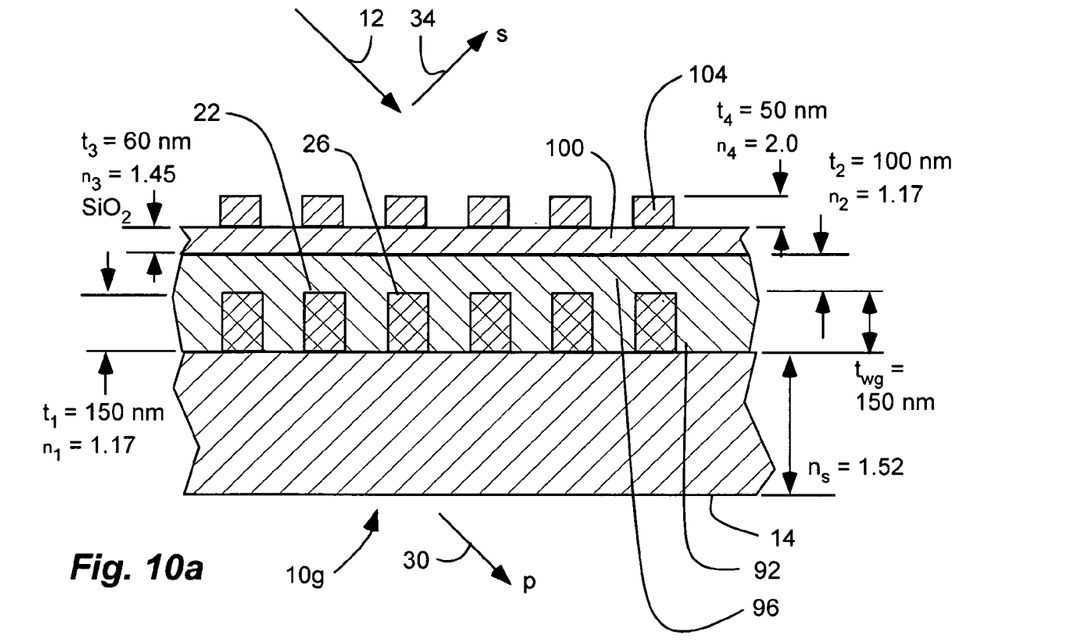
FIGS. 10a and b are cross-sectional side schematic views of multilayer wire grid polarizers in accordance with exemplary embodiments of the present invention (the figures are not to scale and features are shown greatly exaggerated for clarity)
Figure 10B:
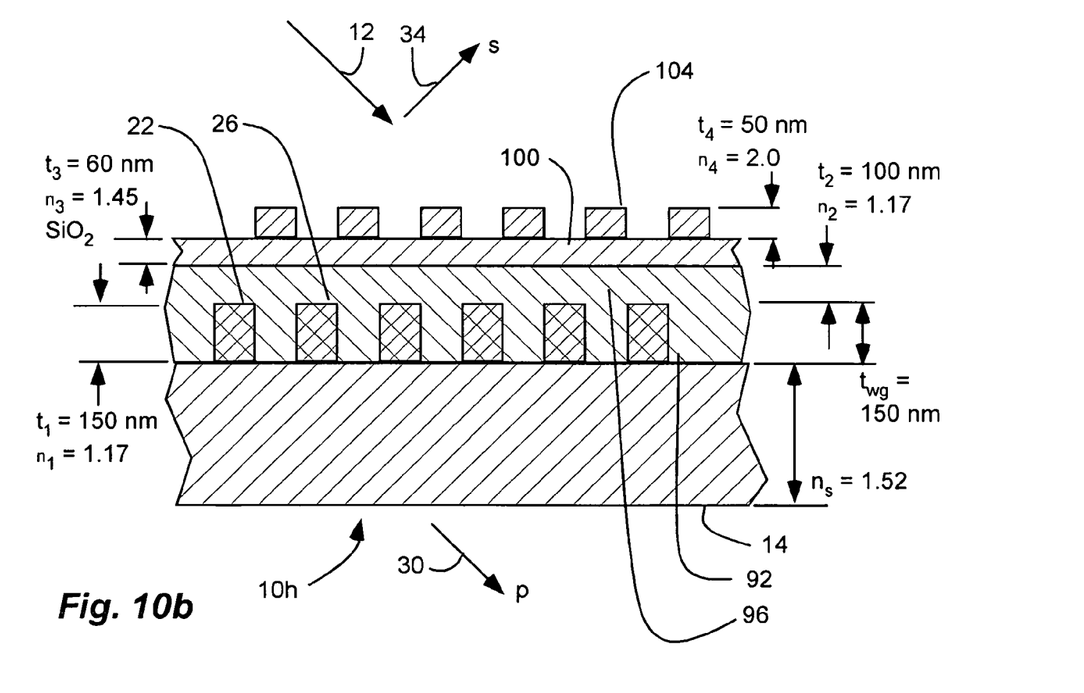

Referring to FIGS. 10a and b, examples of multilayer wire-grid polarizers 10g and h are shown. Both polarizers 10g and h include a wire grid or wire grid layer 22 disposed on a substrate 14. The wire grid can include elements of aluminum and the substrate can be glass (BK7). The period P of the wire grid is 144 nm, and the elements have a thickness $t_{wg}$ of 150 nm. The width w of the elements is 45% of the period, or 65 nm. In addition, the elements 26 define spaces 92 therebetween that include a material with a refractive index $n_1$ of 1.17. A second uniform layer 96 is disposed on top of the elements 26 and spaces 92, or the wire grid layer 22, that has a thickness $t_2$ of 100 nm and a refractive index $n_2$ of 1.17. A third thin film layer 100 is disposed over the second layer 96. The third layer 100 has uniform layer of silicon dioxide (SiO$_2$) and a thickness $t_3$ of 60 nm. Thus, the third layer 100 has an index of refraction $n_3$ of 1.45. A fourth layer 104 is disposed on the third layer 100, and includes a dielectric grid with non-metal elements. The elements of the dielectric grid have a thickness $t_4$ of 50 nm. The elements of the dielectric grid are formed of silicon dioxide (SiO2) and have a refractive index $n_4$ of 2.0. The width w of the elements of the dielectric layer is 50% of the period. The elements of the dielectric layer are disposed substantially directly above the elements of the wire grid, as shown in FIG. 10a. Alternatively, the elements of the dielectric layer can be off-set with respect to the elements of the wire grid, or are shifted one half period so that they are substantially above the spaces between the elements of the wire grid, as shown in FIG. 10b. The light 12 is incident at 45 degrees.

Figure 11:
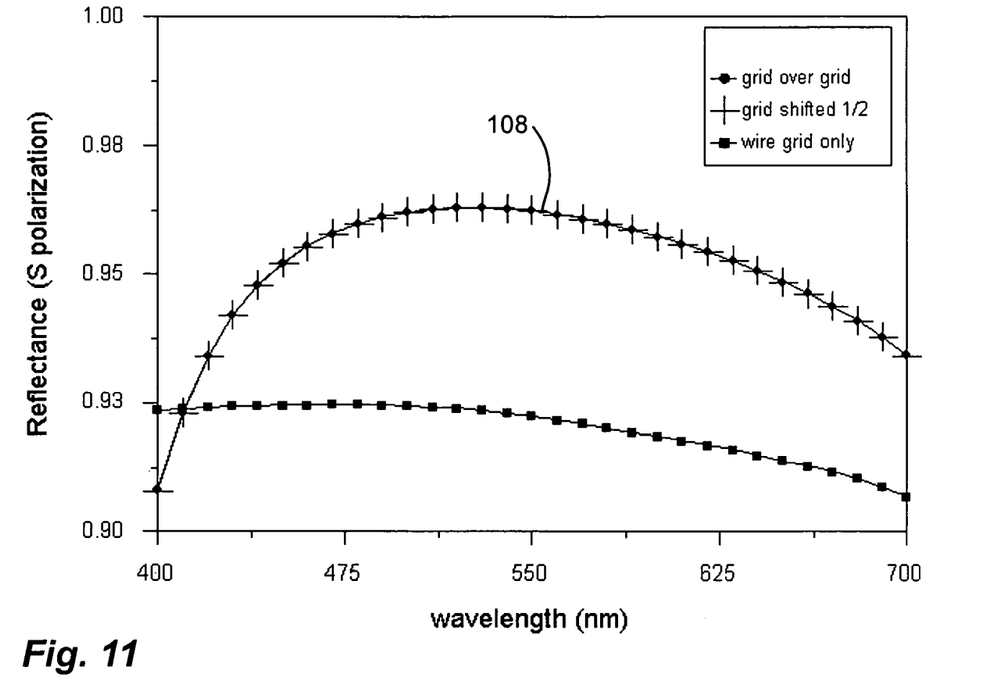
FIG. 11 is a graph of s-polarization reflection versus wavelength for the multilayer wire grid polarizers of FIGS. 10a and b compared to another polarizer.

Referring to FIG. 11, the performance of the polarizers 10g and h are compared with a similar polarizer with only a wire grid on a glass substrate. The polarizers 10g and h have improved reflectance of s polarization, as shown by curves at 104 (which overlap each other). In addition, it appears that the alignment of the dielectric grid to the wire grid is not relevant when the conditions for effective medium theory apply. These examples also show that uniform layers and dielectric layers may be combined and used to advantage. In addition, these examples demonstrate the principle of the effective medium theory.

Figure 12:
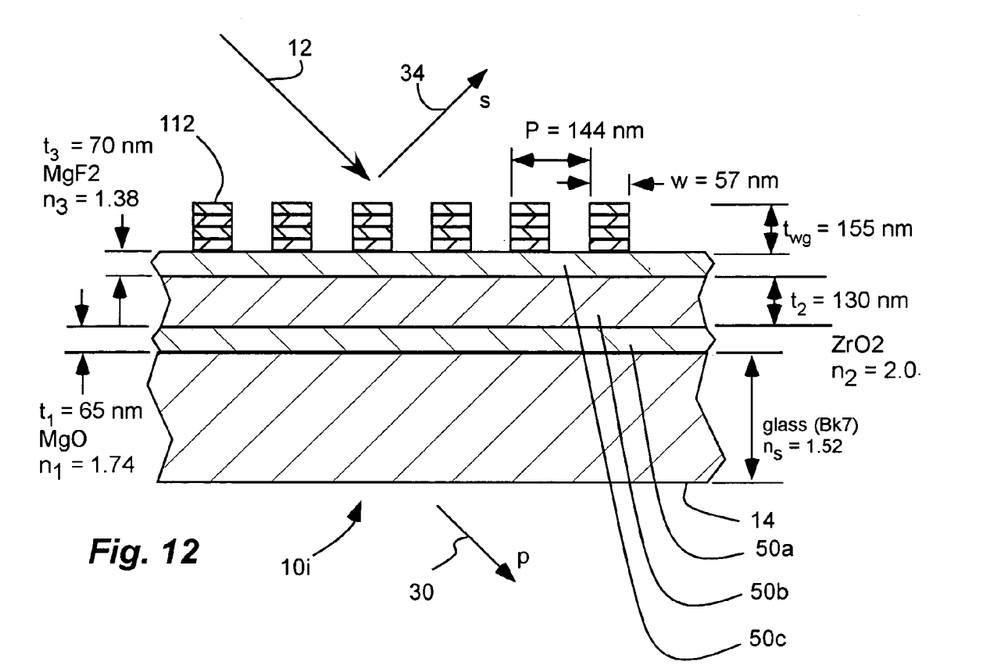
FIG. 12 is a cross-sectional side schematic view of another multilayer wire grid polarizer in accordance with exemplary embodiments of the present invention (the figure is not to scale and features are shown greatly exaggerated for clarity)

Referring to FIG. 12, another example of a multilayer wire-grid polarizer 10i is shown. The polarizer 10i is similar to the polarizer 10c of FIG. 3, but includes a wire grid or wire grid layer 112 with composite elements. The composite elements can include alternating layers of metal and non-metal layers. Examples of such composite elements are found in U.S. Pat. No. 6,532,111, which is herein incorporated by reference. For example, each element can include of alternating layers of aluminum and magnesium fluoride.

Figure 13:
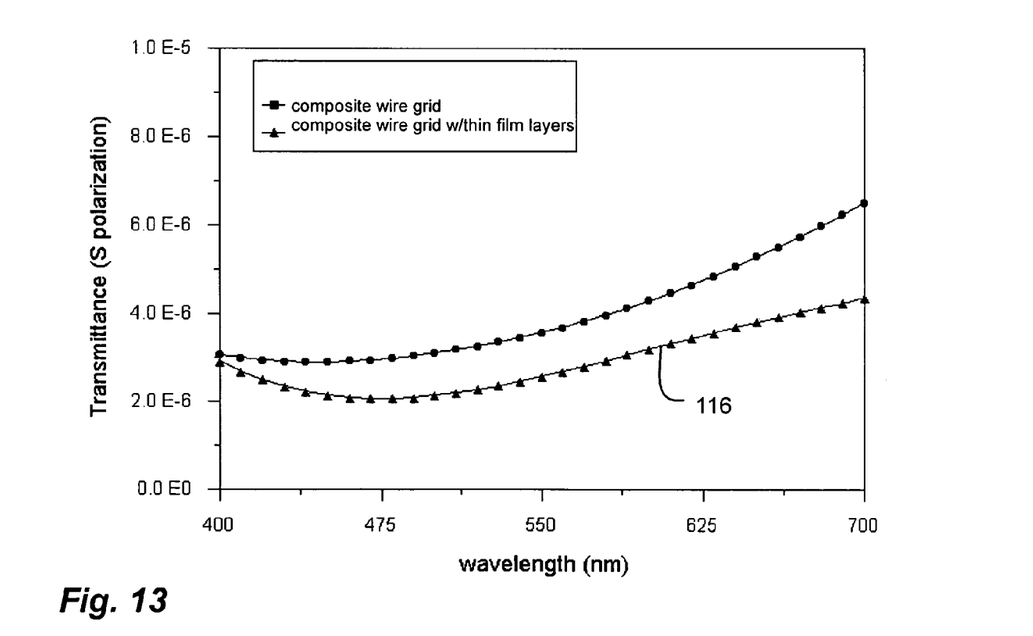
FIG. 13 is a graph of s-polarization transmittance versus wavelength for the multilayer wire grid polarizer of FIG. 12 compared to another polarizer.

Referring to FIG. 13, the performance of the polarizer 10i is compared to a similar polarizer with composite elements, but without the thin film layers between the substrate and the wire grid layer. The polarizer 10i has less leakage or transmittance of s polarization, as shown by curve at 16.

Figure 14:
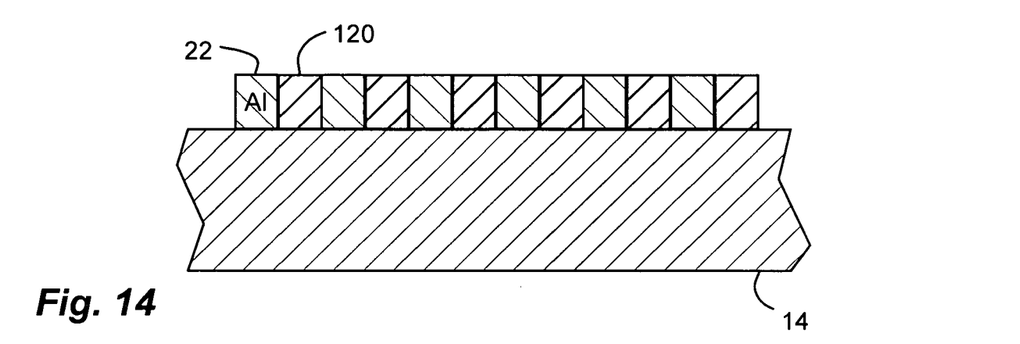
FIG. 14 is a side cross-sectional view of a wire grid layer with a dielectric material in spaces between metal elements of the wire grid layer in accordance with an exemplary embodiment of the present invention.

Referring to FIG. 14, a wire grid layer 22 similar to those described above but with a dielectric material 120 in spaces between metal elements of the wire grid layer. Such a wire grid or wire grid layer can be substituted for any of those described above.

Figure 15:
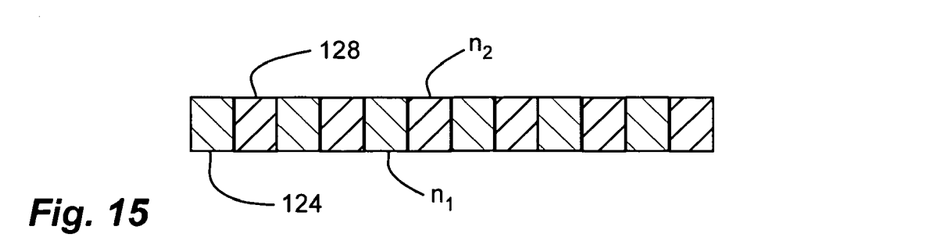
FIG. 15 is a side cross-sectional view of a dielectric grid layer with two dielectric grids with elements of two different materials in accordance with an exemplary embodiment of the present invention.

Referring to FIG. 15 a dielectric grid layer is shown with two dielectric grids 124 and 128 with elements of two different materials having two different indices of refraction $n_1$ and $n_2$ respectively. Thus, the dielectric layer or grid has alternating elements of different material, or elements of one grid disposed in the spaces of another grid. Such a dielectric grid or layer can be substituted for any of those described above.

The examples presented here are but a few of the many possibilities that may be realized from this invention. In general, a combination for uniform layers and dielectric grids may be combined for specific applications such as optimizing transmittance or reflectance over a given range of angles of incident of a given band of light. Optimization may be made for transmittance or reflectance or for both together. Optimization may be made for incidence from the air side on the polarizer or from the substrate side or both.

Various aspects of wire-grid polarizers, optical trains and/or projection/display systems are shown in U.S. Pat. Nos. 5,986,730; 6,081,376; 6,122,103; 6,208,463; 6,243,199; 6,288,840; 6,348,995; 6,108,131; 6,452,724; 6,710,921; 6,234,634; 6,447,120; and 6,666,556, which are herein incorporated by reference.

Although the wire-grid polarizers have been illustrated as facing the light source, or with the elongated elements facing towards the light source, it is understood that this is for illustrational purposes only. Those skilled in the art will appreciate that the wire-grid polarizers can be oriented to face towards imaging bearing beams, such as from a liquid crystal array, for the simple purpose of avoiding passing the image bearing beam through the substrate, and thus avoiding ghost images or multiple reflections associated with light passing through mediums, such as the substrate. Such configurations may result in the wire-grid polarizer facing away from the light source.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A wire-grid polarizer device for polarizing light, comprising:
   a) a substrate;
   b) a wire-grid layer, disposed over the substrate, the wire-grid layer including an array of elongated metal elements having lengths longer than a wavelength of the light and a period less than half the wavelength of the light and defining gaps between the elements;
   c) at least three continuous thin film layers, disposed between the substrate and the wire-grid layer and extending between the gaps, the thin film layers having different refractive indices with respect to one another;
   d) the refractive index of at least one of the three thin film layers being greater than a refractive index of the substrate; and
   e) at least one of the thin film layers includes a dielectric grid including an array of non-metal elements, the non-metal and metal elements of the arrays being oriented substantially parallel with one another, and the arrays having substantially equal periods.

2. A device in accordance with claim 1, wherein the at least three thin film layers are formed of materials selected from the group consisting of: aluminum oxide; antimony trioxide; antimony sulphide; beryllium oxide; bismuth oxide; bismuth triflouride; cadmium sulphide; cadmium telluride; calcium fluoride; eerie oxide; chiolite; cryolite; germanium; hafhnium dioxide; lanthanum fluoride; lanthanum oxide; lead chloride; lead fluoride; lead telluride; lithium fluoride; magnesium fluoride; magnesium oxide; neogymium fluoride; neodymium oxide; praseodymium oxide; scandium oxide; silicon; silicon oxide; disilicon trioxide; silicon dioxide; sodium fluoride; tantalum pentoxide; tellurium; titanium dioxide; thallous chloride; yttrium oxide; zinc selenide; zinc sulphide; and zirconium dioxide.

3. A device in accordance with claim 1, wherein non-metal elements of the dielectric grid are aligned below the metal elements of the wire grid layer.

4. A device in accordance with claim 1, further comprising:
   at least one other thin film layer, disposed over the wire-grid layer.

5. A device in accordance with claim 4, wherein the at least one other thin film layer includes a dielectric grid including an array of non-metal elements, the non-metal and metal elements of the arrays being oriented substantially parallel with one another, and the arrays having substantially equal periods.

6. A device in accordance with claim 5, wherein non-metal elements of the dielectric grid are aligned above the metal elements of the wire grid layer.

7. A device in accordance with claim 1, wherein the elongated metal elements include alternating layers of metal and non-metal materials.

8. A device in accordance with claim 1, wherein at least one of the at least three continuous thin film layers entirely cover a surface of the substrate.

9. A wire-grid polarizer device for polarizing light, comprising:
   a) a substrate;
   b) a wire-grid layer, disposed over the substrate, the wire-grid layer including an array of elongated metal elements having lengths longer than a wavelength of the light and a period less than half the wavelength of the light and defining gaps between the elements;
   c) a first dielectric-grid layer, disposed over the wire-grid layer, the dielectric-grid layer including an array of non-metal elements; and
   d) a plurality of continuous thin film layers with different refractive indices with respect to one another, disposed between the wire-grid layer and the dielectric-grid layer and extending between the gaps; and
   e) at least one of the plurality of continuous thin film layers including a second dielectric grid layer, the second dielectric-grid layer including an array of non-metal elements, the non-metal and metal elements of the arrays being oriented substantially parallel with one another, and the arrays having substantially equal periods.

10. A device in accordance with claim 9, wherein non-metal elements of the second dielectric grid layer are aligned above the metal elements of the wire grid layer.

11. A device in accordance with claim 9, wherein at least one of the plurality of continuous thin film layers entirely covers a surface of the substrate.

12. A wire-grid polarizer device for polarizing light, comprising:
   a) a substrate;
   b) a wire-grid layer, disposed over the substrate, the wire-grid layer including an array of elongated metal elements having lengths longer than a wavelength of the light and a period less than half the wavelength of the light and defining gaps between the elements;
   c) at least three continuous thin film layers, disposed between the substrate and the wire-grid layer and extending between the gaps, the thin film layers having different refractive indices with respect to one another;
   d) the refractive index of at least one of the three thin film layers being greater than a refractive index of the substrate; and
   e) at least one other thin film layer, disposed over the wire-grid layer and including a dielectric grid including an array of non-metal elements, the non-metal and metal elements of the arrays being oriented substantially parallel with one another, and the arrays having substantially equal periods.

13. A device in accordance with claim 12, wherein the at least three thin film layers are formed of materials selected from the group consisting of: aluminum oxide; antimony trioxide; antimony sulphide; beryllium oxide; bismuth oxide; bismuth triflouride; cadmium sulphide; cadmium telluride; calcium fluoride; ceric oxide; chiolite; cryolite; germanium; hafnium dioxide; lanthanum fluoride; lanthanum oxide; lead chloride; lead fluoride; lead telluride; lithium fluoride; magnesium fluoride; magnesium oxide; neogymium fluoride; neodymium oxide; praseodymium oxide; scandium oxide; silicon; silicon oxide; disilicon trioxide; silicon dioxide; sodium fluoride; tantalum pentoxide; tellurium; titanium dioxide; thallous chloride; yttrium oxide; zinc selenide; zinc sulphide; and zirconium dioxide.

14. A device in accordance with claim 12, wherein one of the thin film layers includes a dielectric grid including an array of non-metal elements, the non-metal and metal elements of the arrays being oriented substantially parallel with one another, and the arrays having substantially equal periods.

15. A device in accordance with claim 14, wherein non-metal elements of the dielectric grid are aligned below the metal elements of the wire grid layer.

16. A device in accordance with claim 12, wherein non-metal elements of the dielectric grid are aligned above the metal elements of the wire grid layer.

17. A device in accordance with claim 12, wherein the elongated metal elements include alternating layers of metal and non-metal materials.

18. A device in accordance with claim 12, wherein the at least one of the at least three continuous thin film layers entirely cover a surface of the substrate.

19. A wire-grid polarizer device for polarizing light, comprising:
    a) a substrate;
    b) a wire-grid layer, disposed over the substrate, the wire-grid layer including an array of elongated metal elements having lengths longer than a wavelength of the light and a period less than half the wavelength of the light and defining gaps between the elements;
    c) a first dielectric-grid layer, disposed over the wire-grid layer, the dielectric-grid layer including an array of non-metal elements;
    d) a plurality of continuous thin film layers with different refractive indices with respect to one another, disposed between the wire-grid layer and the dielectric-grid layer; and
    e) at least one of the plurality of continuous thin film layers including a second dielectric grid layer, the second dielectric-grid layer including an array of non-metal elements, the non-metal and metal elements of the arrays being oriented substantially parallel with one another, and the arrays having substantially equal periods.

* * * * *